July 15, 1969  H. D. BUSH ET AL  3,456,186
CIRCUIT FOR MEASURING SHEET RESISTIVITY INCLUDING AN A.C.
CURRENT SOURCE AND AVERAGE READING D.C. VOLTMETER
SWITCHABLY CONNECTED TO PAIRS OF
A FOUR PROBE ARRAY Filed Oct. 31, 1966  3 Sheets-Sheet 1

INVENTORS
HARRY D. BUSH
JOHN R. FASSETT

BY *Moody & Hallacher*

ATTORNEYS

3,456,186
CIRCUIT FOR MEASURING SHEET RESISTIVITY INCLUDING AN A.C. CURRENT SOURCE AND AVERAGE READING D.C. VOLTMETER SWITCHABLY CONNECTED TO PAIRS OF A FOUR PROBE ARRAY

Harry D. Bush and John R. Fassett, Cedar Rapids, Iowa, assignors to Collins Radio Company, Cedar Rapids, Iowa, a corporation of Iowa
Filed Oct. 31, 1966, Ser. No. 590,664
Int. Cl. G01r 27/08
U.S. Cl. 324—64         10 Claims

ABSTRACT OF THE DISCLOSURE

Disclosed is a circuit for measuring sheet resistivity including a current source switchably connected between a first probe and second and third probes, and voltage measuring means switchably connected between a fourth probe and said second and third probes. Advantageously, the current from said current source is adjustable to a multiple of either 0.908 or 0.454 and said voltage measuring means is an average reading D.C. voltmeter which gives a direct reading of the sheet resistivity.

---

This invention relates generally to resistivity measurement and particularly to the measurement of resistivity using a four-point probe along with an automatic averaging circuit.

The sheet resistivity of thin evaporated films and discs of bulk materials is becoming an increasingly important physical parameter in research, development, and production. This invention describes a complete four-point probe system consisting of an inexpensive and widely applicable averaging circuit, and a rapid technique of obtaining precise sheet resistivity measurements. The system herein described requires the use of a four-point probe. A novel probe which can be employed with the present system is fully described in United States application Ser. No. 590,665, filed Oct. 31, 1966, of even date herewith. The invention also shows that the use of a square array of probes on an infinite sheet in combination with the averaging circuit leads to elimination of first order errors due to misalignment of probes, providing a more accurate technique than other forms of sheet resistivity measurement. The elimination of such errors is dependent upon a technique of averaging two resistivity measurements. Each measurement is made using a different pair of probes in a square array. However, one probe is common to each pair. The average of the two readings is the resistivity of the specimen under consideration. The average is obtained by an electronic averaging circuit to provide a continuous single-meter reading representing the resistivity. The system disclosed is applicable to both bounded and unbounded specimens, as will be fully explained hereinafter.

It is therefore an object of this invention to provide a circuit which can be used to measure the resistivity of bounded and unbounded laminae.

It is another object of this invention to provide a system which either manually or automatically yields two distinct readings which can then be averaged to give the resistivity of a semiconductor or thin film material.

It is another object of this invention to provide a circuit which automatically measures the resistivity of materials in accordance with the Van der Pauw theory.

It is another object to provide such a circuit which automatically measures the resistivity of both bounded and unbounded laminae without the need for manual manipulation.

Further objects, features, and advantages of the invention will become apparent from the following description and claims when read in view of the accompanying drawings wherein like numbers indicate like parts and in which:

Figure 1:
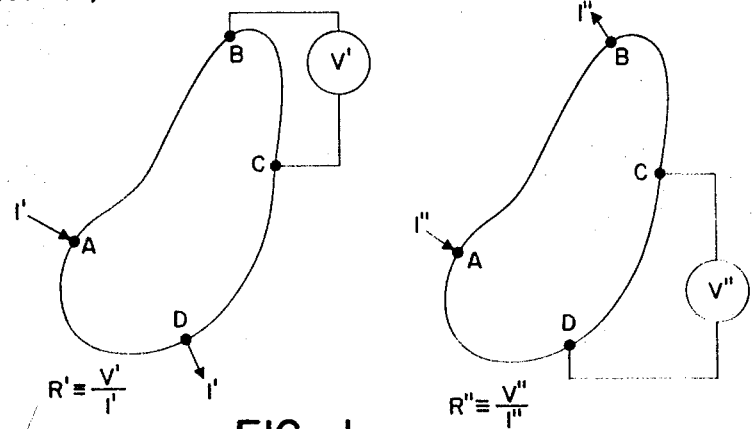
FIGURE 1 shows a simplified diagram which is useful in explaining the Van der Pauw theory upon which the instant invention is based.

The theory upon which the present invention is based was first presented by L. J. Van der Pauw in an article entitled "A Method of Measuring Specific Resistivity and Hall Effect of Discs of Arbitrary Shape" Phillips Research Reports 13:1–9 (1958). Referring to FIG. 1, Van der Pauw theorized that the resistivity of a bounded lamina can be measured by averaging two readings taken from different pairs of probes. A first resistivity ($R'$) measurement is taken with a voltmeter connected across points B and C of a sheet of arbitrary configuration, while a current $I'$ is measured as it passes through points A and D. A second resistivity ($R''$) measurement is taken with a voltmeter across point C and D and the current $I''$ through points A and D is measured. Note that point C is common to both voltage readings and point A is common to both current readings. The measurements of the two transfer impedances $R'$ and $R''$ can therefore be defined as:

$$R' = V_{BC}/I_{AD} \qquad (1)$$

$$R'' = V_{CD}/I_{AB} \qquad (2)$$

Van der Pauw shows in his article that by use of standard electrostatic boundary techniques the bounded sheet resistivity ($r_b$) is:

$$r_b = \frac{\pi}{\ln 2} \left( \frac{R' + R''}{2} \right) f\left( \frac{R'}{R''} \right) \text{ ohm/square} \qquad (3)$$

where the function $f(R'/R'')$ needs some explanation. In order to make the technique generally applicable to arbitrary shaped laminae, Van der Pauw performed a complex transformation of the boundary and arrived at the function $f(R'/R'')$, shown in FIG. 2, a value of $f(R'/R'')$ can therefore be obtained by use of the graph of FIG. 2 after $R'$ and $R''$ are known.

Figure 2:
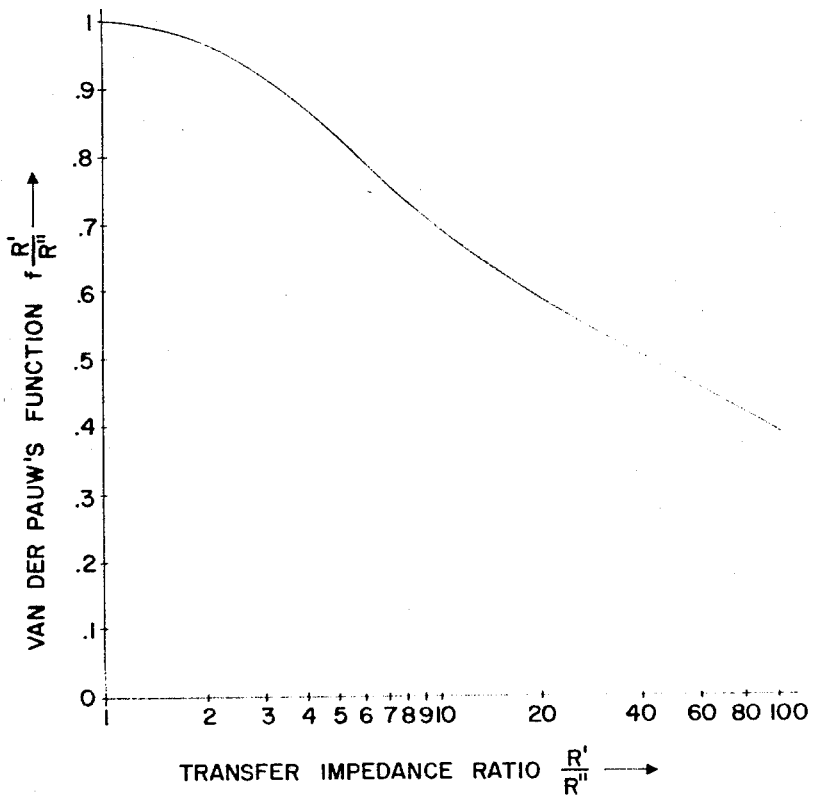
FIGURE 2 shows Van der Pauw's universal function which is essential for measuring sheet resistivities in other known systems but which is eliminated by the instant invention.

To determine the sheet resistivity of a lamina, the two transfer impedances $R'$ and $R''$ are measured with a set of four boundary contacts. Then the horizontal axis of FIG. 2 is entered with the ratio $R'/R''$, reading the value of $f(R'/R'')$ on the vertical axis of this universally applicable curve. When the values $R'$, $R''$, and $f(R'/R'')$ are known, Equation 3 can be unambiguously solved for the sheet resistivity of the lamina. The sheet resistivity, i.e., combined effect of thickness and bulk resistivity, must be reasonably uniform and the four contacts must be on, or very near, the boundary to yield a physically meaningful result. The shape of the boundary can be arbitrary. The probes need not be ohmic, but should be pointed, and they may not be moved between the two sets of measurements needed to obtain $R'$ and $R''$.

Figure 5:
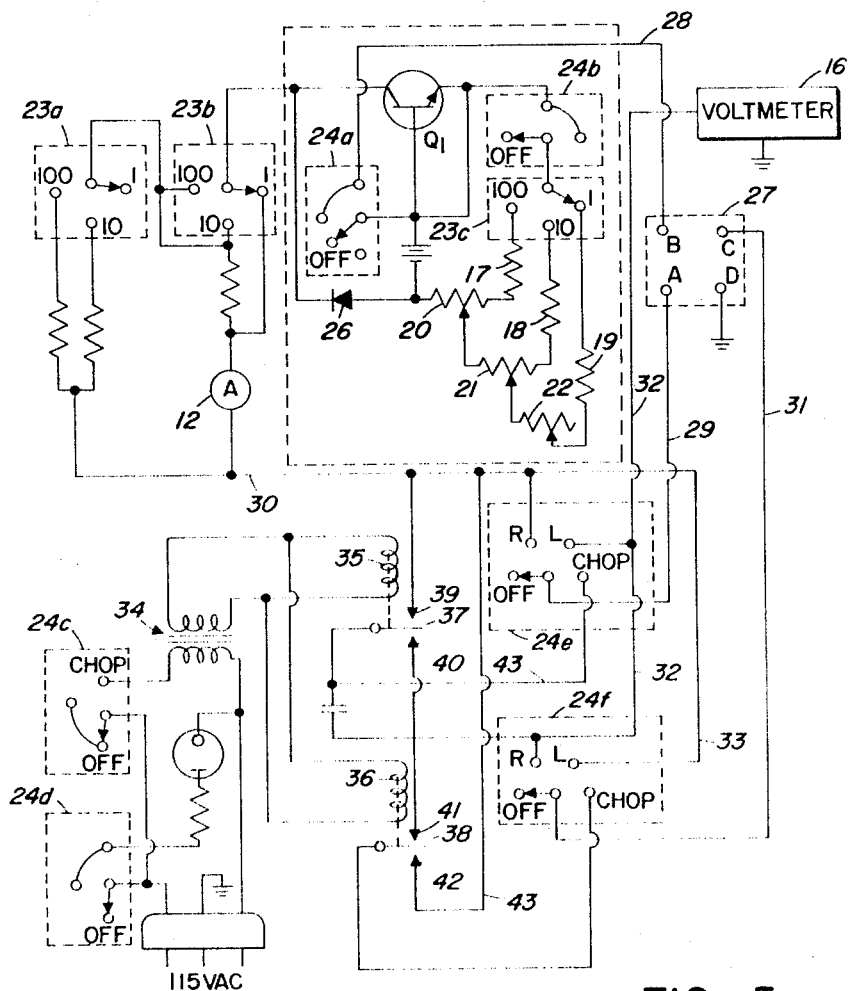
FIGURE 5 shows a schematic of a preferred embodiment of an automatic averaging circuit.

The Van der Pauw theory presented above is directed toward bounded laminae. However, two methods of measuring sheet resistivity using four-point probes are important. These are referred to as the infinite sheet method and the bounded symmetrical sheet method. It will be shown hereinafter that two methods differ only by a factor of two and therefore a single measuring system can be used for both methods. The infinite sheet approach requires placement of a square array of probes onto an effectively infinite sheet. Its main use is in permitting detailed topological mappings of sheet resistivity. The advantage of the technique described here is in the increased precision in measurement due to the elimination of first order errors caused by probe misalignment. Alternatively, the smallest four-point probes have the greatest fractional random variation in probe misalignment encountered in taking a series of topological data. The technique described here allows the use of the smaller probes with no increase in sheet resistivity error, thus permitting measurements closer to the edge of a sheet conductor before introducing current crowding effects. The reduction of the effect of probe misalignment error results from the averaging of two measurements, each made using a different pair of current probes in the square array. An electronic circuit which continuously performs this average is shown in FIG. 5 and will be described hereinafter.

The bounded symmetrical sheet method, according to Van der Pauw, requires four contacts on the boundary of an arbitrarily shaped lamina. The bound method differs from the unbounded method in that the specimen under consideration is too small with respect to the probe dimensions to be considered infinite. In its most general form, this technique requires two separate measurements, the use of the curve of FIG. 2, and a calculation to arrive at an answer. This invention shows that the use of the averaging circuit shown in FIG. 5, along with approximate mirror plane symmetry in boundary and probe location, is sufficient to yield a single meter reading of high precision and accuracy. The most useful form of the Van der Pauw function expressed in Equation 3 calls for an elimination of the need to refer to FIGURE 2 for a determination of the value of $f(R'/R'')$. Reference to FIGURE 2 shows that by maintaining the conditions $$1.0 \leq \left(\frac{R'}{R''}\right) \leq 1.5 \tag{4}$$

the function $f(R'/R'') \cong 1.0$ within 1 to 2%. Thus, by using a boundary and probe setup symmetrical about the line AC in FIG. 1 and maintaining any extreme sheet resistivity nonuniformity symmetrical about the same line AC, it is possible to eliminate the need for $f(R'/R'')$ in Equation 3. As a reasonable example, 4 can be met by maintaining geometrical symmetry within 10%, while maintaining nonsymmetrical sheet resistivity variations within 40%. Such experimental conditions are easily met with instruments using either a circular boundary with probes spaced at 90°, or a square boundary with all four probes located at the center of each side or at each corner. By maintaining the same current through the sample for both transfer impedance measurements by using a good constant current source, and meeting the above geometrical symmetry requirements, Equation 3 operationally reduces to $$r_b = \frac{\pi}{\ln 2}\left(\frac{V_{aver}}{I}\right) = 4.54\left(\frac{V_{aver}}{I}\right) \text{ ohm/square} \tag{5}$$

This form of the Van der Pauw function readily shows that by using a constant current source and averaging two voltage readings the resistivity of a bounded lamina can be measured directly simply by building the constant 4.54 multiple into the measuring circuitry.

A simple extension of Van der Pauw's analysis of bounded laminae can be made to include the placement of four probes in a square array on an infinite sheet of resistive material to measure the unbounded resistivity ($r_u$). Using the same criterion for probe location symmetry and symmetrical resistivity uniformity as needed for the bounded case above, the equation reduces to $$r_u = \frac{2\pi}{\ln 2}\left(\frac{V_{aver}}{I}\right) = 9.08\left(\frac{V_{aver}}{I}\right) \text{ ohms/square} \tag{6}$$

The unbounded function of Equation 6 is therefore seen to differ from the bounded function of Equation 5 only by a factor of two. The same circuit can therefore be used to measure both bounded and unbounded resistivities simply by changing the calibration of the readout means or the multiple built into the averaging circuit.

Figure 3:
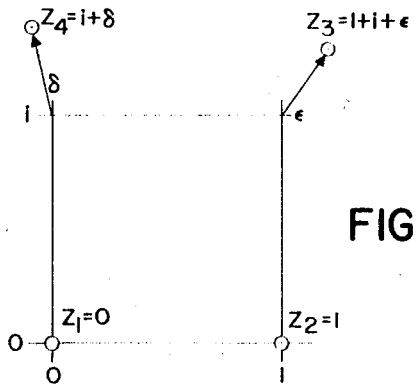
FIGURE 3 is a graphic representation which is useful in explaining the upper bound error inherently present when using a four-point probe array as used in instant invention.

By considering the probe geometry as shown in FIGURE 3, where arbitrary deviations of $\delta$ and $\epsilon$ from the ideal square array are used to represent the general case, it can be shown that the average of two independent resistivity measurements using different pairs of current probes leaves an approximate upper bound of $$|\Delta|_{bound} \cong |\epsilon|^2 + |\delta|^2 \tag{7}$$

on the fractional error of the sheet resistivity measurement. These measurements can either be taken individually and averaged manually or they can be combined into a circuit design that incorporates continuous electronic averaging to reduce the measurement to a single meter reading. The circuit shown in FIG. 5 averages the two readings electronically.

Referring to FIGURE 3, the potential difference between points $Z_3$ and $Z_4$ on an infinite sheet of resistivity R due to a current I between $Z_1$ and $Z_2$ is, according to the standard two-dimensional electrostatic analogue, $$V_{34} = \frac{IR}{2\pi} \ln \frac{|Z_3 - R_1| \cdot |Z_4 - Z_2|}{|Z_3 - Z_2| \cdot |Z_4 - Z_1|} \tag{8}$$

and likewise the potential difference between $Z_2$ and $Z_3$ due to I between $Z_1$ and $Z_4$ is $$V_{23} = \frac{IR}{2\pi} \ln \frac{|Z_3 - Z_1| \cdot |Z_4 - Z_2|}{|Z_3 - Z_4| \cdot |Z_2 - Z_1|} \tag{9}$$

To determine the desired average of these adjacent measurements, one obtains on factoring $$\overline{V} = \frac{V_{34} + V_{23}}{2\pi} =$$

$$\frac{IR}{4\pi}\left|\frac{(1+i)^2(1-i)^2\left(1+\frac{\epsilon}{1+i}\right)^2\left(1-\frac{\delta}{1-i}\right)^2}{i^2(1-i\epsilon)(1-i\delta)(1+\delta-\epsilon)}\right| \tag{10}$$

or $$\overline{V} - \frac{IR}{2\pi}\ln 2 = \frac{IR}{4\pi}\ln\left|\frac{\left(1+\frac{\epsilon}{1+i}\right)^2\left(1-\frac{\delta}{1-i}\right)^2}{(1-\epsilon)(1-\delta)(1+\epsilon-\delta)}\right| \tag{11}$$

The fractional error of the mean value from ideal conditions is defined as $$\Delta \equiv \frac{\overline{V} - V_0}{V_0} \tag{12}$$

where, $$V_0 = \frac{IR}{2\pi}\ln 2 \tag{13}$$

the case where $\delta = \epsilon = 0$.

Recalling the complex definition of the logarithm as $$\ln f(z) \equiv \ln|f(z)| + 2\pi i \arg f(z)$$

Equations 10, 11 and 12 can be used to yield $$\Delta \ln 2 = \text{Re}\left[\ln\left(1+\frac{\epsilon}{1+i}\right) + \ln\left(1-\frac{\delta}{1-i}\right) - \frac{1}{2}\ln(1-1\epsilon) - \frac{1}{2}\ln(1-i\delta) - \frac{1}{2}\ln(1+\epsilon-\delta)\right] \tag{14}$$

Expanding in a Taylor series about the point $Z=1$, yields $$\Delta \ln 2 = \text{Re} \sum_{n=1} \frac{(-1)^{n-1}}{n} \left[ \left(\frac{\epsilon}{1+i}\right)^n + \left(\frac{-\delta}{1-i}\right)^n - \frac{1}{2}(-i\epsilon)^n - \frac{1}{2}(-i\delta)^n - \frac{1}{2}(\epsilon-\delta)^n \right] \quad (15)$$

All $n=1$ terms cancel, leaving $$\Delta \ln 2 = \text{Re} \sum_{n=2} \frac{1}{n} \left[ \frac{(i\epsilon)^n}{2} + \frac{(i\delta)^n}{2} + \frac{(\delta-\epsilon)^n}{2} - \left(\frac{-\epsilon}{1+i}\right)^n - \left(\frac{\delta}{1-i}\right)^n \right] \quad (16)$$

using the fact that $$\text{Re} \sum x_1 \leq \left|\sum x_1\right| \leq \sum |x_1| \quad (17)$$

one can show that an upper bound on the error is $$|\Delta| \leq -\left\{\frac{1+\sqrt{2}}{\sqrt{2} \ln 2}\right\} \left\{ |\epsilon| + |\delta| + \left[\frac{\sqrt{2}}{1+\sqrt{2}}\right] \ln \left[ (1-|\epsilon|) \left(1-\frac{|\epsilon|}{\sqrt{2}}\right) (1-|\delta|) \left(1-\frac{|\delta|}{\sqrt{2}}\right) \right] \right\} \quad (18)$$

which is valid when $$(|\epsilon| + |\delta|) < 1$$

An excellent approximation to the rigorous Equation 18 for smaller probe deviations ($\epsilon$, $\delta < 0.2$) is obtained by truncating the series in Equation 16 after $n=2$, yielding $$|\Delta|_{\text{bound}} \cong (|\epsilon|^2 + |\delta|^2) \quad (19)$$

The above approximate equation reiterates what was rigorously shown in (16)—namely, that the use of an average, as defined in (10) when taking infinite sheet square array measurements eliminates all first order errors due to probe misalignment.

Figure 4:
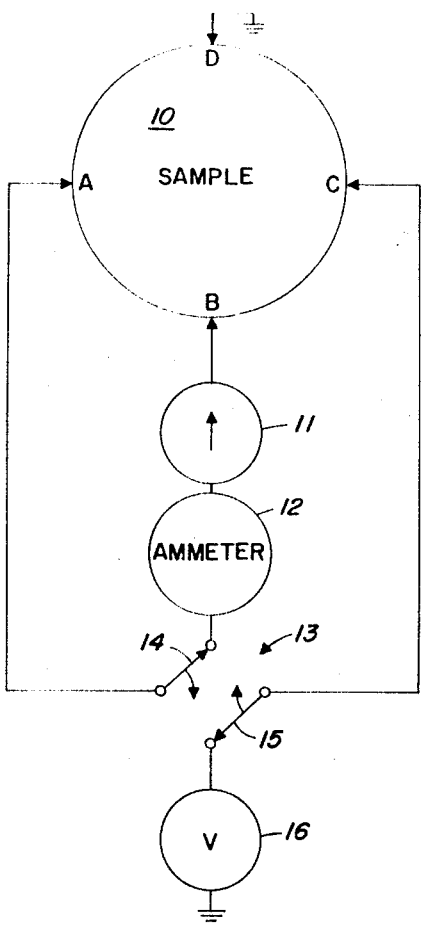
FIGURE 4 is a block diagram of the circuit which comprises instant invention.

FIGURE 4 is a block diagram of the circuitry used to eliminate the need for making two measurements and having to manually average them to determine sheet resistivity of sample 10. The current source 11 in series with an ammeter 12 is switched alternately from the pair of probes A, B to the pair B, C by use of switch 13. Switch 13 is built such that both pivotable arms 14 and 15 simultaneously change positions. Voltmeter 16 is connected to the pair of probes C, D where current source 11 is connected to probes A, B and to probes A, D where current source 11 is connected to produce B, C. By using a voltmeter which responds with a D.C. average and by adjusting current source 11 to be either a multiple of 0.908 or 0.454, as shown in Equations 5 and 6, the value of the voltmeter reading 16 need only have its decimal point determined to give a direct reading of the sheet resistivity.

FIGURE 5 is the schematic diagram of the circuit used to make four-point probe measurements. The collector-base loop of a common base transistor $Q_1$ is used as constant current source 11. A first set of decade resistors 17, 18, 19, in conjunction with a second set of decade reistors 20, 21, and 22 enables adjustment of current source 11 as required for obtaining the 0.908 and 0.454 multiples. By controlling the low level forward-biased current in the emitter-base loop with this variable resistance, the effective current source impedance is maintained in the tens of megohms region over a controlled collector current range of from 10 microamperes to 10 milliamperes. The ganged three-wafer switch 23a, 23b, and 23c serves to simultaneously change ammeter shunts and emitter-loop resistors in decade increments. The ganged six-wafer switch 24a to 24f permits manual switching of the probe connections in the "right" and "left" positions. Ganged six-wafer switch 24 also permits synchronous switching, using a pair of mercury wetted break-before-make relays in the "chop" position.

Manual operation of the circuit shown in FIGURE 5 is initiated by turning switch 24 from the "off" position to the "right" or "left" position. Assuming the "right" position is chosen and that Jones plug 27 is labeled and connected to be consistent with the labeling of FIGURE 1 the operation of the circuit is as follows:

Current will flow from constant current source 11 via line 28 to terminal B of the sample. With switch 24 in the "right" position the current will flow through the sample out of terminal A to line 29 through wafer 24e to line 30 and through ammeter 12. It should be noted that simultaneously with this current flow the voltage across terminals C and D is measured from terminal D through line 31 wafer 24f via line 32 to the input of the voltmeter. Upon manual operation of switch 24 from the "right" to the "left" position current ceases to flow from terminal B to A of the switch but commences from terminal B to C via line 31 through wafer 24f to lines 33 and 30 through ammeter 12. Simultaneous with this current flow the voltage across junctions A and D is measured via line 29 through wafer 24e line 32 to the input side of the voltmeter. Because the current is constant the average voltage of the two readings is a direct indication of the sheet resistivity in accordance with Equations 5 to 6 depending upon whether or not the sample under consideration was bounded or unbounded.

Automatic operation of the circuit is initiated by turning switch 24 to the "chop" position. In this position the pivotable arm at wafer 24c connects transformer 34 across the 115 volt A.C. source. Because of the phasing of coils 35 and 36 make-and-break leaf switches 37 and 38 will vibrate between contacts 39 and 40 and 41 and 42 respectively. Assuming that leaf 37 is in electrical contact with contact 39 and lead 38 electrically contacts contact 41 the operation is as follows:

Current will pass from current source 11 via line 28 through terminals A and B of the wafer through line 29 through wafer 24e and line 43 through leaf 37 and contact 39 to line 30 and ammeter 12. At the same time the voltage is measured between terminals C and D from terminal C via line 31 through wafer 24f, leaf 38 and contact 41 and via line 32 to the input of voltmeter 16. As the polarity of the input changes leaves 37 and 38 will respectively come in electrical contact with contacts 40 and 42. In this position current will flow from current source 11 via line 28 through contacts B and C via line 31 through wafer 24f, leaf 38 and contact 42 through line 43 to line 30 and ammeter 12. At the same time the voltage is measured from D to A from point A via line 29 to wafer 24e via line 43 to leaf 37 and contact 40 and via line 32 to the input of voltmeter 16. Because of the varying polarity of the input of the circuit leaves 38 and 39 will continuously fluctuate between the leaves 37 and 38 and contacts 39 and 40 and 41 and 42 to thereby effect a change of current through the sample under consideration, while simultaneously changing the connection of voltmeter 16 to said sample between two different pairs of terminals to thereby give the two measurements required for the resistivity measurements by use of the Van der Pauw function. By using a D.C. average reading voltmeter the reading of the voltmeter 16 is a direct indication of the resistivity of the sample under consideration.

An R-C filter can be added to the output in order to integrate any spikes which may be caused by the action of the break-before-make relays, thereby helping the voltmeter to maintain stable average readings. Silicon diode 26 is placed in the collector circuit of transistor $Q_1$ in order to clip any spikes which may exist because of the relay action. The proper phasing of coils 35 and 36 will also eliminate any spikes caused by the relay action. The use of diode 26 and the R-C filter are therefore design configurations and are not critical to the invention.

Although this invention has been described with respect to a particular embodiment thereof, it is not to be so

We claim:
1. A system for measuring sheet resistivity comprising first, second, third and fourth probes, a current source, means connecting said current source to said first probe, switching means for switchably connecting said current source between said second and third probes, voltage measuring means, means connecting said voltage measuring means to said fourth probe, said switching means switchably connecting said voltage measuring means to said second and third probes, said switching means connecting said current source and said voltage measuring means to said second and third probes alternately.

2. The system of claim 1 wherein said current source is a constant current source adjustable to multiples of 0.908 and 0.454 and said voltage measuring means is an average reading D.-C. voltmeter.

3. The system of claim 2 wherein said current source is at transistor.

4. The system of claim 3 wherein said transistor is a common base transistor, the collector-base loop of which forms said current source.

5. The system of claim 4 including means for selectively varying the current output of said current source.

6. The system of claim 3 wherein said switching means includes a multiposition switch having a first and a second position for manually affecting the alternate connection of said current source.

7. The system of claim 3 and including an external A.C. source wherein said switching means includes a plurality of inductive means for receiving current from said external A.-C. source, a plurality of movable contacts actuated by said inductive means, a pair of stationary contacts associated with each one of said movable contacts so that said movable contacts fluctuate between said pairs of stationary contacts as said external source changes polarity to automatically affect the alternate connection of said current source.

8. The system of claim 6 and including an external A.-C. source wherein said multiposition switch includes a third position and wherein said switching means includes a plurality of inductive means for receiving current from said external A.-C. source, a plurality of movable contacts actuated by said inductive means, a pair of stationary contacts associated with each one of said movable contacts so that said movable contacts fluctuate between said pairs of stationary contacts as said external source changes polarity to automatically affect the alternate connection of said current source when said multiposition switch is in said third position.

9. The system of claim 8 including means for selectively varying the current output of said current source.

10. The system of claim 9 wherein said transistor is a common base transistor the collector-base loop of which forms said current source.

References Cited

UNITED STATES PATENTS

| | | | |
|---|---|---|---|
| 1,718,687 | 6/1929 | Enlund | 324—64 |
| 2,891,219 | 6/1959 | Camp | 324—62 |
| 3,254,301 | 5/1966 | McGrath et al. | 324—64 X |

FOREIGN PATENTS

| | | |
|---|---|---|
| 506,173 | 5/1939 | Great Britain. |

OTHER REFERENCES

Harris, Forest K.: Electrical Measurements, N.Y., John Wiley & Sons, Inc., 1952, p. 399.

EDWARD E. KUBASIEWICZ, Primary Examiner

J. M. HANLEY, Assistant Examiner

U.S. Cl. X.R.

324—158

UNITED STATES PATENT OFFICE
CERTIFICATE OF CORRECTION

Patent No. 3,456,186                 July 15, 1969

Harry D. Bush et al.

It is certified that error appears in the above identified patent and that said Letters Patent are hereby corrected as shown below:

Column 3, line 49, after "example," insert -- condition --.
Column 4, lines 31 and 32, the equation should appear as shown below:

$$V_{34} = \frac{IR}{2\pi} \ln \frac{|Z_3 - Z_1| \cdot |Z_4 - Z_2|}{|Z_3 - Z_2| \cdot |Z_4 - Z_1|}$$

Column 7, line 20, "at" should read -- a --.

Signed and sealed this 21st day of April 1970.

(SEAL)
Attest:

EDWARD M. FLETCHER, JR.           WILLIAM E. SCHUYLER, JR.
Attesting Officer                Commissioner of Patents